United States Patent
Ilinich et al.

(10) Patent No.: US 11,052,445 B2
(45) Date of Patent: Jul. 6, 2021

(54) HYDROFORMING OF PORTHOLE EXTRUSION WITH NON-EQUIANGULAR SEAMS

(71) Applicant: Ford Motor Company, Dearborn, MI (US)

(72) Inventors: Andrey Ilinich, Novi, MI (US); Stephen Kernosky, Livonia, MI (US); Mark Salmonowicz, Royal Oak, MI (US); S. George Luckey, Jr., Dearborn, MI (US)

(73) Assignee: Ford Motor Company, Dearborn, MI (US)

( * ) Notice: Subject to any disclaimer, the term of this patent is extended or adjusted under 35 U.S.C. 154(b) by 353 days.

(21) Appl. No.: 15/884,469

(22) Filed: Jan. 31, 2018

(65) Prior Publication Data

US 2019/0232354 A1    Aug. 1, 2019

(51) Int. Cl.
  *B21D 26/047* (2011.01)
  *B21D 26/053* (2011.01)
  *B23P 15/00* (2006.01)
  *B21C 23/00* (2006.01)
  *B21D 26/033* (2011.01)
  *B21D 53/88* (2006.01)

(52) U.S. Cl.
  CPC ............ *B21D 26/047* (2013.01); *B21C 23/00* (2013.01); *B21D 26/033* (2013.01); *B21D 26/053* (2013.01); *B23P 15/00* (2013.01); *B21D 53/88* (2013.01)

(58) Field of Classification Search
  CPC ....... B21D 26/033; B21C 25/02; B21C 25/08; B21C 23/00; B21C 23/085; B21C 29/003
  See application file for complete search history.

(56) References Cited

U.S. PATENT DOCUMENTS

| | | | |
|---|---|---|---|
| 2,817,113 A | 12/1957 | Thomas | |
| 7,077,639 B2 | 7/2006 | Dohmann et al. | |
| 8,096,799 B2 | 1/2012 | Wallen | |
| 8,298,682 B2* | 10/2012 | Weiland | B21C 23/085 428/586 |
| 8,826,712 B1* | 9/2014 | Luckey, Jr. | B21D 26/033 72/58 |
| 9,533,343 B2 | 1/2017 | May et al. | |
| 2015/0047405 A1* | 2/2015 | Horstemeyer | B21C 29/003 72/253.1 |
| 2015/0360281 A1* | 12/2015 | May | B21C 23/085 138/171 |

FOREIGN PATENT DOCUMENTS

JP    5086025    11/2012

* cited by examiner

*Primary Examiner* — Adam J Eiseman
(74) *Attorney, Agent, or Firm* — Burris Law, PLLC

(57) ABSTRACT

A method of forming a part includes extruding a billet through a die, forming a round, closed geometry tube from the billet, and hydroforming the round, closed geometry tube. The extrusion die contains an orifice with a central mandrel, a plurality of bridges, and a corresponding plurality of portholes between the bridges. A spacing of the bridges around the mandrel is non-equiangular. As a result, the round, closed geometry tube has non-equiangular welds after emerging from the die.

8 Claims, 4 Drawing Sheets

HYDROFORMING OF PORTHOLE EXTRUSION WITH NON-EQUIANGULAR SEAMS

FIELD

The present disclosure relates to aluminum extruded tube for automotive applications.

BACKGROUND

The statements in this section merely provide background information related to the present disclosure and may not constitute prior art.

Vehicle manufacturers are implementing lighter, stronger materials, such as aluminum alloys to meet emission reduction goals, meet fuel economy goals, reduce manufacturing costs, and reduce vehicle weight. Increasingly demanding safety standards must be met while reducing vehicle weight. One approach to meeting these competing interests and objectives is to hydroform high strength aluminum alloy tubular blanks into strong, lightweight parts.

Aluminum tubes for this purpose include extruded seamless tube and extruded structural tube. Extruded seamless tube are relatively expensive, while extruded structural tubes are lower in cost because of increased performance of the structural extrusion process where multiple profiles can be extruded simultaneously.

Extruded structural tubes are formed by extruding an aluminum billet through an extrusion die at a high temperature and at high pressure. Discontinuous material flow across the section of the shape occurs when the flowing aluminum separates in a mandrel plate and re-converges in a cap section. A weld line, or joining line, is created where the flowing aluminum re-converges to form the extruded shape. Extruded structural (also known as the porthole) tubes may have two or more weld lines that are an artifact of the extrusion process.

The extruded structural tubes may subsequently undergo a series of processing operations, such as bending, pre-forming, hydro-forming, piercing and machining, to be formed into desired complex-shaped parts. The weld lines in the extruded structural tubes have relatively low ductility and can sustain relatively low stress/strain. The extruded structural tubes may fracture at the weld lines during the series of processing operations.

These issues with cracking of structural tubes in hydro-forming operations, among other tube forming operations, is addressed by the present disclosure.

SUMMARY

In one form, a method of forming a part is provided, which includes extruding a material through a die, forming a round, closed geometry tube from the material, shaping the round, closed geometry tube into an intermediate shape, and hydroforming the intermediate shape into the part. The die contains an orifice with a central mandrel, a plurality of bridges, and a corresponding plurality of portholes between the bridges. A spacing between the bridges around the central mandrel is non-equiangular. As a result, the round, closed geometry tube has non-equiangular welds after emerging from the die.

In other features, the die includes a plurality of orifices, each orifice having a central mandrel, a plurality of bridges, and a corresponding plurality of portholes between the bridges. A spacing between the bridges around each of the central mandrels is non-equiangular. Locations of the bridges and portholes of each of the orifices may be identical or may be mirrored between adjacent orifices. The method further includes optional steps of orienting the round, closed geometry tube prior to the step of shaping, and the step of verifying the predetermined position of the non-equiangular welds after the step of hydroforming. The part may be an A-pillar roof rail of a vehicle structure.

In another form, a method of forming a part is provided, which includes extruding a material through a die and forming a round, closed geometry tube from the material. The die contains an orifice with a central mandrel, a plurality of bridges, and a corresponding plurality of portholes between the bridges. A spacing between the bridges around the central mandrel is non-equiangular. The round, closed geometry tube has non-equiangular welds after emerging from the die.

In still another form, an apparatus for forming a round, closed geometry tube is provided, which includes a die. The die has a round orifice, a central mandrel disposed within the round orifice, and a plurality of bridges and a corresponding plurality of portholes between the bridges. The bridges and portholes extending around the central mandrel. A spacing between the bridges around the mandrel is non-equiangular.

In other features, the die includes a plurality of round orifices, a plurality of central mandrels disposed within each of the round orifices, and sets of bridges and corresponding portholes between the bridges, each of the sets of bridges and portholes extending around each of the central mandrels. Spacing between the bridges and portholes of each of the plurality of round orifices may be identical or mirrored between adjacent round orifices. The apparatus may further include a shaping apparatus adapted to receive the round, closed geometry tube for further processing.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

Corresponding reference numerals indicate corresponding parts throughout the several views of the drawings.

DETAILED DESCRIPTION

The following description is merely exemplary in nature and is not intended to limit the present disclosure, application, or uses.

Figure 1:
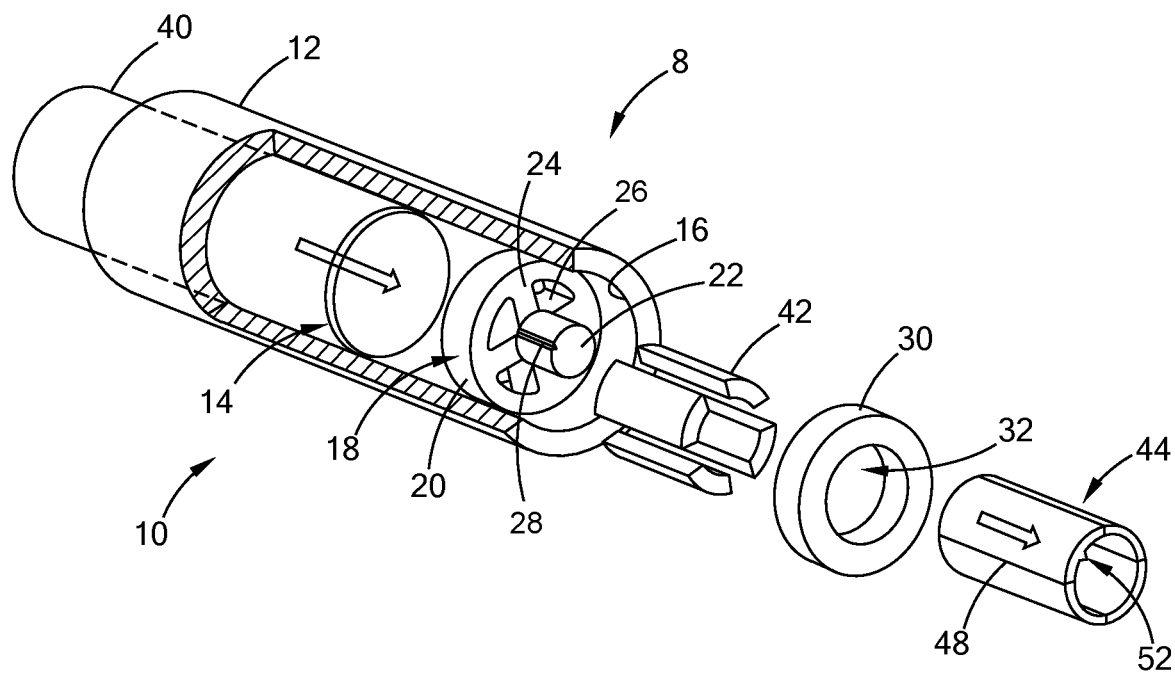
FIG. 1 is an exploded perspective view of a porthole extrusion apparatus including a die constructed in accordance with the teachings of the present disclosure.

Referring to FIG. 1, a porthole extrusion apparatus 8 constructed in accordance with the teachings of the present disclosure includes a die 10 and a container 12 that receives the die 10 therein. The die 10 is configured to form a round, closed geometry tube, such as a tube 44, from a material 40, which in one form may be a billet. The die 10 includes a plate 18, a central mandrel 22, and a cap 30. The container 12 includes a receiving space 14 having an inner surface 16. The plate 18, the central mandrel 22, and the cap 30 are disposed in the receiving space 14 of the container 12. The plate 18 and the cap 30 have outer surfaces against the inner surface 16 of the container 12. The central mandrel 22 is connected to the plate 18 and extends axially from the plate 18 in the downstream direction.

The plate 18 includes an outer ring 20 disposed against the inner surface 16, a plurality of bridges 24 extending in a radial direction of the outer ring 20, and a plurality of portholes 26 disposed between the plurality of bridges 24. The plurality of bridges 24 connect the outer ring 20 to the central mandrel 22 and are spaced apart along the radial direction at a spacing that is non-equiangular. The portholes 26 are disposed between adjacent ones of the bridges 24. In the illustrative example of FIG. 1, four bridges 24 and four portholes 26 are shown. It is understood that any number of bridges 24 and portholes 26 may be formed in the plate 18.

The cap 30 is disposed in the receiving space 14 of the container 12 and downstream from the plate 18. The cap 30 defines an opening 32 and surrounds the central mandrel 22 to define an annular or round orifice 33 therebetween through which the extruded tube 44 exits the die 10.

Figure 2:
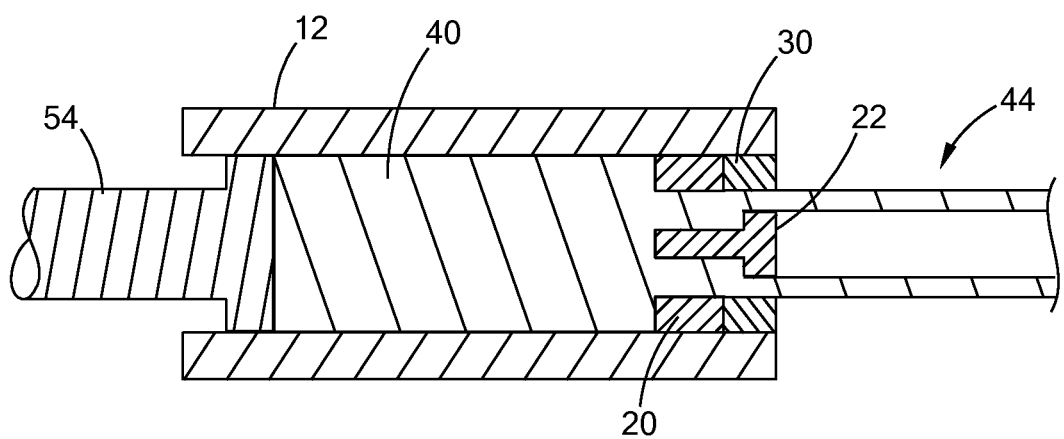
FIG. 2 is a side cross-sectional view the porthole extrusion apparatus of FIG. 1 in accordance with the teachings of the present disclosure.

Referring to FIG. 2, the porthole extrusion apparatus 8 further includes a ram stem 54 disposed upstream from the die 10, the container 12, and the billet 40. To extrude the billet 40 into a tube 44, the billet 40 is inserted into the container 12 and pressed by the ram stem 54. The billet 40 is an aluminum alloy billet in one form and is extruded at high temperature and pressure through the die 10. In a first stage, the billet 40 is extruded through the portholes 26 of the plate 18 to form a plurality of tube sections 42 (shown in FIG. 1). In a second stage, as the billet 40 and the tube sections 42 continue to be pressed by the ram stem 54, the tube sections 42 re-converge and then pass the annular orifice 33 between the central mandrel 22 and the cap 30 to form a closed, round tube 44 due to the pressure and heat inside the die 10.

The dashed arrows F in FIG. 2 indicate the flow direction of the aluminum material, which is originally in the form of billet 40, is separated into multiple flows at the plate 18, is re-converged before the annular orifice 33 between the central mandrel 22 and the cap 30, and then exit the die 10 in the form of a closed tube 44. Re-convergence of the tube sections 42 creates weld seams 48 where the tube sections 42 are joined to each other. The weld seams 48 extend longitudinally along the length of the tube 44. The weld seams 48 are not welds in the traditional sense but rather are seams where tube sections 42 are joined by pressure and heat.

Referring back to FIG. 1, optionally, the central mandrel 22 may include a marking element 28, which may be a raised or a recessed structural feature on an outer surface of the central mandrel 22. When the tube sections 42 re-converge before the annular orifice 33 between the central mandrel 22 and the cap 30, the marking element 28 causes formation of a pip 52 along the length of the tube 44. The marking element 28 creates a pip 52 in the aluminum tube near in time with the formation of the weld seams 48 and is located at a fixed position relative to the weld seams 48. The pip 52 is a locating feature that allows a person or machine to determine a weld seam location. The method of forming an extruded tube with locating feature has been disclosed in U.S. Pat. No. 9,533,343, titled "Aluminum Porthole Extruded Tubing with Locating Feature," which is commonly assigned to the assignee of the present application and the content of which is incorporated herein by reference in its entirety.

Figure 3:
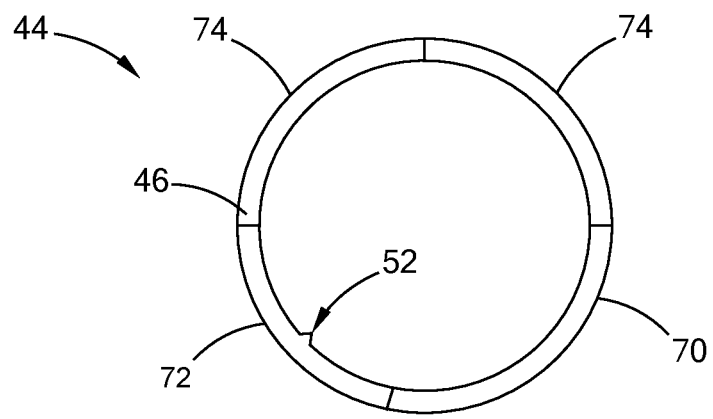
FIG. 3 is a front cross-sectional view of a tube that is extruded by the die of FIG. 1, wherein four weld seams at non-equiangular positions are shown.

Referring to FIG. 3, the tube 44 extruded by the die 10 of the porthole extrusion apparatus 8 is shown to be a round tube having a plurality of weld seams 48 extending longitudinally along the length of the tube 44 and completely through the sidewall 46 of the tube 44. It is understood that the weld seams 48 are present, but may not be visible in the extruded tube 44. The number of the weld seams 48 corresponds to the number of the portholes 26 and the number of the bridges 24 of the plate 18. The bridges 24 are arranged to have a non-equiangular spacing therebetween. Therefore, the weld seams 48 are located at non-equiangular locations so that the sidewall 46 of the tube 44 is divided by the weld seams 48 into a plurality of curved portions not of the same size.

In the illustrative example of FIG. 3, four weld seams 48 are formed in the tube 44 to divide the tube 44 into four curved portions including a first curved portion 70 having an arc angle of greater than 90°, a second curved portion 72 having an arc angle of smaller than 90°, and two third curved portions 74 having an arc angle of 90°. By making one weld seam 48 offset from its equiangular location, one of the curved portions is made larger. The increased angular length of the first curved portion 70 in the tube 44 will help position the weld seams 48 away from a high stress/strain region during a subsequent forming processes, which will be described in more detail below.

Figure 4:
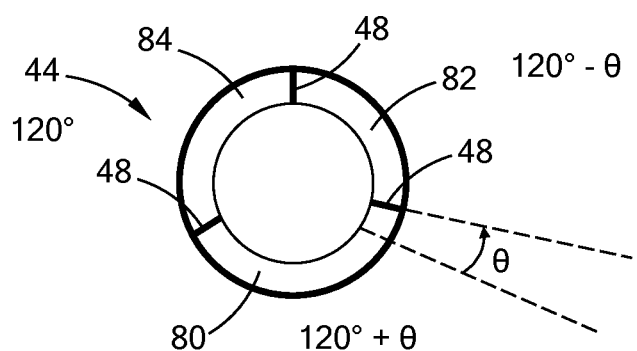
FIG. 4 is a schematic view of a tube showing three weld seams at non-equiangular positions.

Referring to FIG. 4, the die 10 may alternatively include a plate 18 having three bridges 24 and three portholes 26. Therefore, the tube 44 extruded by the die 10 may include three weld seams 48 that divide the tube 44 into a first curved portion 80, a second curved portion 82, and a third curved portion 84. One of the weld seams 48 may be offset from its equiangular position A a predetermined angle θ such that the first curved portion 80 has an arc angle of larger than 120° (i.e., 120°+θ°), the second curved portion 82 has an arc angle of smaller than 120° (i.e., 120°−θ°), and the third curved portion 84 has an arc angle of 120°. The first curved portion 80 is larger than the second curved portion 82 and the third curved portion 84.

Figure 5:
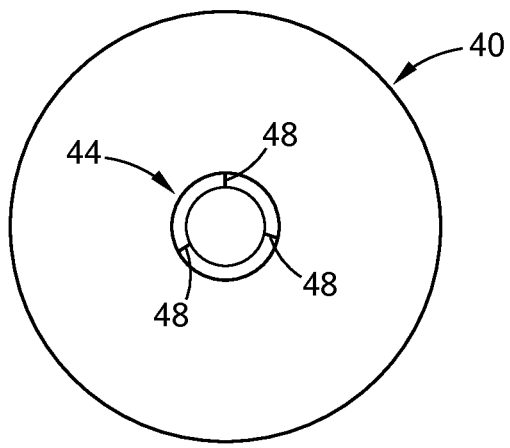
FIG. 5 is a schematic view depicting a material/billet that is extruded by the die of the porthole extrusion apparatus of FIG. 1 into one tube.
Figure 6:
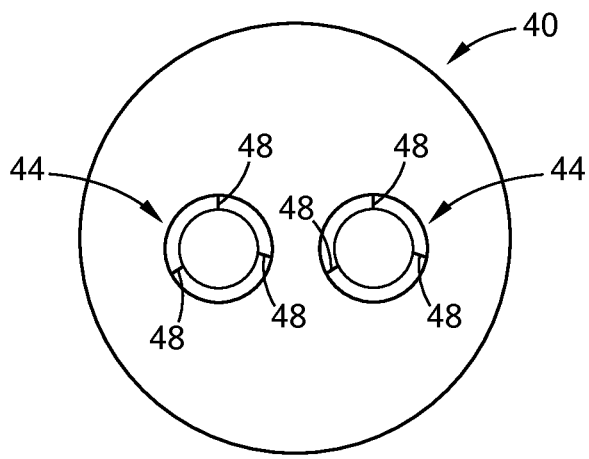
FIG. 6 is a schematic view depicting a material/billet that is extruded by a modified die of the porthole extrusion apparatus of FIG. 1 into two tubes with weld seams at identical locations.
Figure 7:
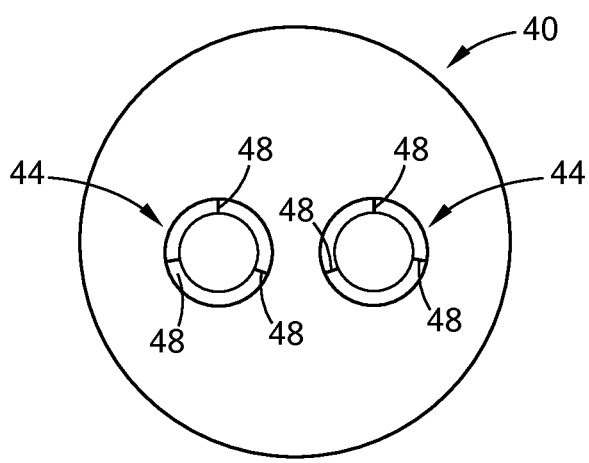
FIG. 7 is a schematic view depicting a material/billet that is extruded by a modified die of the porthole extrusion apparatus of FIG. 1 into two tubes with weld seams at mirrored locations.

Referring to FIGS. 5 to 7, the die 10 may be configured to extrude one extruded tube (FIG. 5) or two extruded tubes (FIGS. 6 and 7), or more extruded tubes at a time. As shown in FIG. 5, the die 10 of the porthole extrusion apparatus 8 may include one orifice 33 (shown in FIG. 2) for extruding one extruded tube 44 from one billet 40. The plate 18 of the die 10 is configured to include three bridges 24 and three portholes 26, thereby generating an extruded tube with three weld seams 48. Similarly, a spacing of the bridges 24 is non-equiangular so that the weld seams 48 are located at non-equiangular locations.

Referring to FIG. 6, alternatively, the die 10 of the porthole extrusion apparatus 8 may be configured to include two orifices 33 for extruding two extruded tubes 44 simultaneously from one billet 40. Each orifice 33 corresponds to a central mandrel 22, a plurality of bridges 24, and a corresponding plurality of portholes 26 between the bridges 24. The plurality of bridges 24 and portholes 26 for the two orifices 33 may be formed in one plate 18. In other words, the die 10 includes one plate 18 having two sets of bridges 24 and portholes 26, two central mandrels 22, and one cap 30 defining two openings 32. The two central mandrels 22 are inserted in the two openings 32 of the cap 30 to define two orifices 33. A spacing of the bridges 24 around each of the central mandrels 22 is non-equiangular. The bridges 24 may be arranged so that spacing between the bridges 24 and the portholes 26 of each of the orifices 33 are identical. Therefore, the two extruded tubes 44 extruded from the two orifices 33 of the same die 10 have weld seams 48 at identical spacings. While three weld seams 48 are shown in FIG. 6, it is understood that each set of bridges 24 and portholes 26 for each orifice 33 can have any number of bridges 24 and portholes 26 to form a tube with a corresponding number of weld seams 48.

While not shown in the figures, it is understood that the die may be configured to have a plurality of central mandrels 22, a plate 18 including a plurality sets of bridges 24 and portholes 26 around the plurality of central mandrels 22, and a cap 30 that defines a plurality of orifices 33 jointly with the plurality of central mandrels 22. The number of the sets of bridges 24 and portholes 26 and the number of the central mandrels 22 may be one, two or more.

Referring to FIG. 7, similar to FIG. 6, the die 10 of the porthole extrusion apparatus may be configured to include two orifices 33 for extruding two extruded tubes 44 simultaneously from one billet 40. However, the bridges 24 and the portholes 26 of the plate 18 may be arranged so that the spacing between the bridges 24 and portholes 26 for each of the orifices 33 are mirrored between adjacent orifices 33. As a result, the two extruded tubes 44 extruded from the two orifices 33 have weld seams 48 at mirrored spacings as they exit the die 10 of the porthole extrusion apparatus 8.

Figure 8:
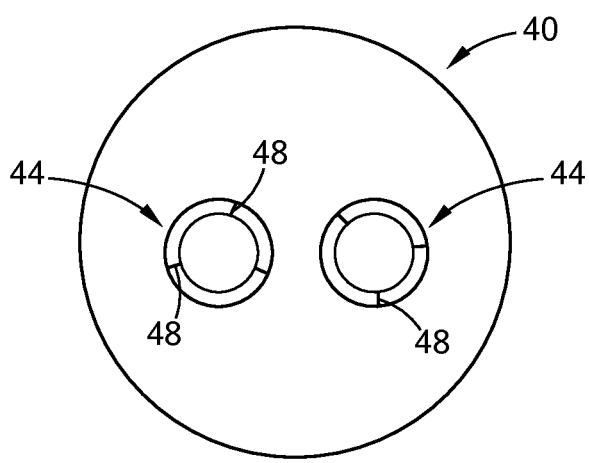
FIG. 8 is a schematic view a material/billet that is extruded by a modified die of the porthole extrusion apparatus of FIG. 1 into two tubes with weld seams that have the same non-equiangular spacing but that are angularly offset from one another.

Referring to FIG. 8, in another form of the present disclosure, the bridges 24 and the portholes 26 of the plate 18 for the two orifices 33 are arranged to have identical non-equiangular spacing, but the bridges 24 and the portholes 26 for one orifice 33 are offset angularly relative to the bridges 24 and the portholes 26 of the other orifice 33 such that the weld seams of the resulting two extruded tubes are offset angularly relative to each other.

After the tube 44 is extruded by the die 10 of the porthole extrusion apparatus, the tube 44 is subject to a hydroforming process to be formed into a finished part having a desired final shape. Prior to hydroforming, the tube 44 may go through a series of processes such as bending, pre-forming and cutting.

Figure 9:
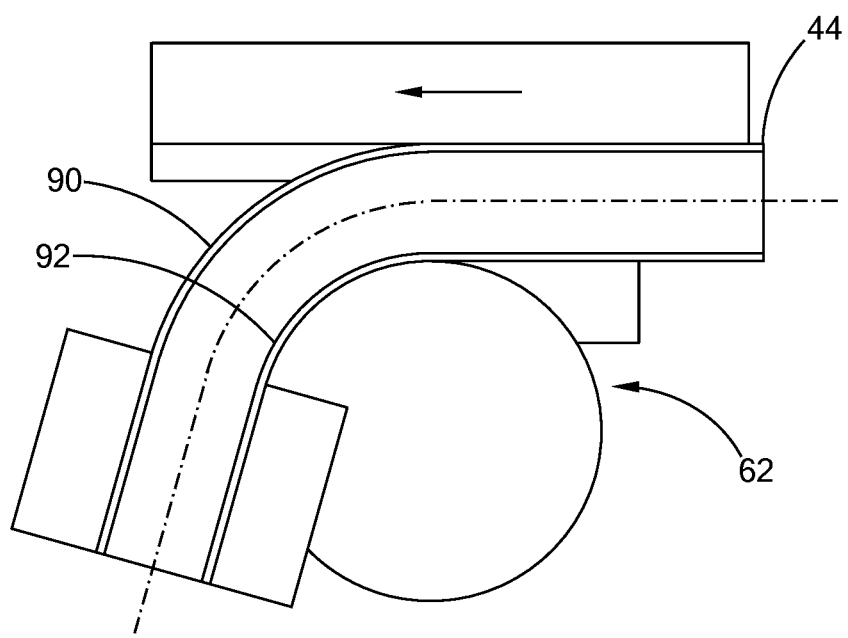
FIG. 9 is a schematic view of a rotary draw bending tool for bending a tube extruded by the die of the porthole extrusion apparatus of FIG. 1.

Referring to FIG. 9, a rotary draw bending tool 62 may be used to bend the tube 44 to roughly shape the extruded tube 44 into an intermediate shape prior to hydroforming process so that the tube 44 will fit into the die for hydroforming process. The tube 44 may be bent by the bending tool 62 into an outer curved portion 90 and an inner curved portion 92. The weld seams 48 of the tube 44 have slightly different material properties than the rest of the tube 44, which can cause early strain localization during a subsequent hydroforming operation, where the tube 44 may fail when being expanded or bent circumferentially.

To reduce the likelihood that the tube 44 will crack at or adjacent to the weld seams 48, the tube 44 may be properly oriented in the rotary draw bending tool 62 at a predetermined position such that the non-equiangular welds 48 are disposed away from the high-risk areas. Examples of high-risk areas include hydroforming die corners, hydroforming die split line, areas of local circumferential expansion, and any areas where splits have been observed experimentally. High-risk areas may be predicted upfront by a finite element simulation of the forming process sequence. Non-equiangular spacing between the welds gives greater flexibility in placing welds away from the high-risk areas. Relative to a conventional equiangular weld spacing, the non-equiangular spacing typically results in a substantially reduced risk of failure due to early strain localization at or adjacent to the welds.

After the tube 44 is bent, the tube 44 may undergo a hydroforming process to be formed into a final part having a complex shape, such as an A-pillar roof rail for a vehicle structure. During the hydroforming process, the weld seams 48 are properly positioned to be located away from highly strained areas of the final part to be formed. After the hydroforming process, the predetermined position of the non-equiangular weld seams may be verified.

In a method of forming a part according to the present disclosure, an aluminum billet is extruded through a die to form a round, closed geometry tube. In one form, the die contains an orifice with a central mandrel, a plurality of bridges and a corresponding plurality of portholes between the bridges. In another form, the die contains a plurality of orifices each including a central mandrel, a plurality of bridges and a corresponding plurality of portholes between the bridges. A spacing of the bridges around the central mandrel is non-equiangular. As a result, a round, closed geometry tube formed from the billet has a non-equiangular weld seams after emerging from the die. The tube 44 is extruded in a continuous operation. The tube 44 may be stretched after extrusion. The extruded structural tube 44 is cut into desired lengths. Later, the tubes 44 are aligned in a bending tool 62 and are oriented to place the weld seams 48 at a predetermined location where the tube experiences less stress/strain during subsequent forming steps. Finally, the bent tube undergoes a hydroforming process to be formed into a final part having a desired shape. The finished part may be an A-pillar roof rail for a vehicle structure.

It should be noted that the disclosure is not limited to the embodiment described and illustrated as examples. A large variety of modifications have been described and more are part of the knowledge of the person skilled in the art. These and further modifications as well as any replacement by technical equivalents may be added to the description and figures, without leaving the scope of the protection of the disclosure and of the present patent.

What is claimed is:
1. A method of forming a part comprising:
   extruding a material through a die containing an orifice with a central mandrel, a plurality of bridges, and a corresponding plurality of portholes between the bridges, wherein a spacing between the bridges around the central mandrel is non-equiangular, forming a round, closed geometry tube from the material, the round, closed geometry tube having non-equiangular welds after emerging from the die;

shaping, by a shaping tool, the round, closed geometry tube into an intermediate shape, wherein the round, closed geometry tube is positioned relative to the shaping tool based on locations of the non-equiangular welds such that the non-equiangular welds are disposed away from a high strained area of the part during and after the shaping process; and hydroforming the intermediate shape into the part.

2. The method according to claim 1, wherein the die comprises a plurality of orifices, each orifice having a central mandrel, a plurality of bridges, and a corresponding plurality of portholes between the bridges, wherein a spacing of the bridges around each of the central mandrels is non-equiangular.

3. The method according to claim 2, wherein spacing between the bridges and portholes of each of the orifices is identical.

4. The method according to claim 2, wherein spacing between the bridges and portholes of each of the orifices is mirrored between adjacent orifices.

5. The method according to claim 1 further comprising the step of verifying the predetermined position of the non-equiangular welds after the step of hydroforming.

6. The method according to claim 1, wherein the step of shaping the round, closed geometry tube comprises bending.

7. The method according to claim 6 further comprising the step of preforming the intermediate shape after bending and prior to hydroforming.

8. The method according to claim 1, wherein the material is an aluminum alloy.

* * * * *